United States Patent [19]

Flesher et al.

[11] Patent Number: 4,585,843
[45] Date of Patent: Apr. 29, 1986

[54] EXOTHERMIC REACTIONS

[75] Inventors: Peter Flesher; David Farrar; Ian M. Johnson, all of West Yorkshire, United Kingdom

[73] Assignee: Allied Colloids, Ltd., England

[21] Appl. No.: 676,691

[22] Filed: Nov. 30, 1984

Related U.S. Application Data

[63] Continuation-in-part of Ser. No. 600,583, Apr. 17, 1984, abandoned.

[30] Foreign Application Priority Data

Apr. 20, 1983 [GB] United Kingdom ................ 8310662

[51] Int. Cl.$^4$ .............................................. C08F 2/02
[52] U.S. Cl. ................................................... 526/63
[58] Field of Search ................. 526/63; 524/787, 788, 524/701, 745

[56] References Cited

U.S. PATENT DOCUMENTS 2,846,421  8/1958  Pollock ................................. 526/63
4,335,237  6/1982  Ballweber ........................ 526/63 X Primary Examiner—Paul R. Michl
Attorney, Agent, or Firm—Lawrence Rosen

[57] ABSTRACT

An exothermic gel polymerization process conducted in the presence of water is initiated at a low temperature, is held for most of the process at a higher temperature by including in the medium a particulate heat sink material, such as sodium sulphate decahydrate, that is substantially insoluble in the medium and which undergoes an endothermic phase change and is then allowed to rise to a higher temperature. Either as a result of the endothermic change, or as a result of a subsequent exothermic change, at the end of the process the heat sink material is again solid particulate material substantially insoluble in the medium and so the product is a dispersion of the material in a polymer gel. The polymer is water soluble.

15 Claims, No Drawings

EXOTHERMIC REACTIONS

This application is a continuation-in-part of our co-pending U.S. patent application ser. no. 600,583, filed Apr. 17, 1984, now abandoned.

Polymerisation reactions in which mono-ethylenically unsaturated monomers are polymerised to form linear, water-soluble, polymers are usually exothermic. In large scale processes, it is very difficult to dissipate heat to the surroundings at a fast enough rate to prevent the reaction mixture from overheating. The quality of the final product depends on the polymerisation conditions and, in particular, on the temperature. If the temperature is too high, insolubilisation is likely to occur. If it is too low, unreacted monomer may remain in the polymer.

It is possible to conduct the polymerisation by a reverse phase reaction in which droplets or beads of the reaction mixture are dispersed into a continuous phase. The exothermic heat of the reaction is dissipated into the continuous phase. For example, an aqueous solution of water-soluble monomers may be dispersed and polymerised in a continuous oil phase.

Bulk gel polymerisations are particularly difficult to cool. If the outside of a vessel containing a bulk solution polymerisation mixture is cooled, the cooling is generally effective only to the reaction mixture at the edges of the vessel, and so if the vessel is large the reaction mixture in the middle of the vessel reaches high temperatures. This may be dangerous. The resultant product will vary widely across the cross section of the vessel, with severe risk of residual monomer near the outside and insoluble polymer at the centre. The result is a low quality product having a very wide range of molecular weights.

Bulk gel polymerisations have conventionally been carried out at low solids concentrations, for instance 75 to 250 parts water per 100 parts monomer, in order that there is a large amount of solvent per mole of reactant which may absorb the exothermic heat of reaction. However the product has a very low concentration of polymer and must generally be dried before being sold. Drying processes are highly energy-expensive. It is well known in the art that it is preferred that acrylamide is polymerised in the presence of water otherwise undesirable side reactions which produce beta-alamine and polyamide may take place.

In U.S. Pat. No. 4,335,237 there is disclosed a process for making polymers in which the produce has a very low free water content and the polymerisation is conducted in the presence of sodium sulphate decahydrate. The exemplified reactions are in face carried out in the absence of added free water, and all the water in the final produce is derived from the decahydrate. The process therefore incurs a high risk of unwanted byproduct formation. Additionally the process would be difficult to conduct economically on a commercial scale due to the very high cost of anhydrous acrylamide.

In the example illustrating a gel polymerisation process, for the polymerisation of acrylamide, 2,2-azobis-(isobutyronitrile) is used as the initiator in the presence of a very large amount of sodium sulphate decahydrate. The initiator is only effective as such at temperatures above about 50° C. and so presumably the reaction mixture will have been deliberately heated to this temperature before polymerisation commences. This will have allowed at least some of the sodium sulphate decahydrate to change state endothermically by losing water to its lower state of hydration, so that the polymerisation reaction can proceed in the aqueous phase. If the polymerisation starts below the temperature at which water is released from the decahydrate, the polymerisation would be non-aqueous, with high risk of byproduct formation.

In our European Patent Publication No.87859 (which was not published at the priority date of this application), we describe various ways of forming polymeric matrices in which heat sink material such as sodium sulphate decahydrate is incorporated. In some of these processes an exothermic polymerisation is conducted in the presence of a solution of heat sink material. Since the material is in solution, it cannot undergo a phase chnage and so does not cool the exothermic reaction mixture. In other processes, the heat sink material is in particulate form during the polymerisation but the heat sink material is added whilst in its high energy state so that it undergoes an exothermic phase change, if the initial temperature of the reaction medium is below the transition temperature, thereby heating the medium.

A problem with commercial bulk solution polymerisations is that it is necessary to maximise molecular weight, avoid cross linking and other insolubilisation reactions, eliminate low molecular weight components and conduct the process using convenient concentrations of monomer in water. Neither U.S. Pat. No. 4,335,237 or EP Pat. No. 87859 offer any suggestions as to how these objectives may be achieved.

According to the invention, a polymer is produced by an exothermic bulk gel polymerisation of a reaction mixture comprising 100 parts polymerisable monomers dissolved in about 33 to 250 parts water (preferably about 75 or 100 to 200 parts water) and the reaction mixture is cooled by adding to it a heat sink material that is in a first thermodynamic state, is particulate and is substantially insoluble in the reaction mixture, and in this process the polymerisation reaction is initiated at a temperature $T_1$ at which the heat sink material remains in its first thermodynamic state, the temperature of the reaction mixture rises exothermically to $T_2$ at which the heat sink material undergoes an endothermic change of state to a second thermodynamic endothermic change of state to a second thermodynamic state by absorbing the exothermic heat of polymerisation, preferably retaining the temperature of the reaction medium at $T_2$, and the amount of heat sink material is such that after all the heat sink material is in its second thermodynamic state, the temperature rises exothermically to a temperature $T_3$ and the polymerisation is completed at this temperature, and the process includes the step of converting heat sink material from the first thermodynamic state to a final thermodynamic state in which it is particulate and substantially insoluble in the liquid medium.

The temperature $T_2$ is the transition temperature at which the heat sink material changes from its first thermodynamic state to its second thermodynamic state.

By conducting the process with a first stage, after the polymerisation has been initiated, at $T_1$ we find it is possible to increase the molecular weight of the final products. Usually between 2 and 50%, preferably between 5 and 25%, of the polymerisation reaction occurs during this period.

Most of the polymerisation occurs at the period when the temperature remains at $T_2$, generally between 30 and 90%, preferably between 60 and 80%, of the reaction occuring at this stage. We find that this reduces the risk of unwanted cross linking or insolubilisation and yields a more uniform molecular weight, especially across the cross section of the polymerisation vessel.

When all the heat sink material has changed into its second thermodynamic state, the temperature is allowed to rise to a temperature $T_3$ and at this stage we find that by this means we can achieve reaction of substantially all the residual monomer without insolubilisation of the polymer. Usually between 2 and 35%, preferably between 5 and 25%, of the polymerisation occurs at this last stage.

The process of the invention is of particular value when the monomers are selected from acrylic acid and acrylamide as these monomers cause very high exotherms during polymerisation, and preferably the amount of water introduced with these monomers is at least 75 parts, often at least 100 parts, per 100 parts by weight monomer. Similar values are suitable for other anionic monomers but cationic monomers may be polymerised at high concentrations, e.g., down to 33 parts water per 100 parts monomer.

The temperature $T_1$ is generally fairly low, for instance between 0° and 20° C. For this reason, the initiator of the polymerisation reaction is generally a redox initiator rather than a thermal initiator. $T_2$ is determined by the choice of heat sink and, for most monomers, is preferably in the range 25° to 75° C., preferably 30° to 60° C. $T_3$ will be selected having regard to the monomers but is usually in the range 55° to 120° C., preferably 60° to 100° C.

Because the process can start at a low temperature $T_1$, polymers are formed having high molecular weights, for example greater than 1 million, preferably greater than 3 million. At low temperatures, the redox initiator creates a small number of free radicals to initiate polymerisation, so that the produce comprises a relatively small number of long polymer chains.

Because the temperature is held at $T_2$ for a large part of the process, the polymers have regular molecular weights. Because of the temperature rise to $T_3$, there is little residual monomer in the product. The conversion efficiency of the process is therefore high and the toxicity of the product is low. Because the process is started as a solution process, it is convenient to conduct on a commercial scale.

In contrast, in the process disclosed in U.S. Pat. No. 4,335,237 (example 1) there is no free water in the initial mix and there is no initial stage at a lower temperature $T_1$ and so the process will tend not to produce polymers having such high molecular weights as are possible in the invention. In addition, there is no suggestion that the amount of heat sink material should be selected carefully such as to allow a controlled and predetermined rise in temperature and so does not have a final stage where the temperature is allowed to rise to react any residual monomer, and does not have the associated advantages. 2.8% monomer remains in the product.

The second thermodynamic state may be the said final thermodynamic state and thus the endothermic change may result in the heat sink material being particulate and substantially insoluble in the liquid medium. Often however the process includes a further step in which the heat sink material is converted from the second thermodynamic state to the said final thermodynamic state, and this further step is essential if the heat sink material is not particulate and substantially insoluble when it its second thermodynamic state. Generally this conversion to the final state is effected by cooling the liquid medium whereupon the heat sink material, as a result of the cooling, undergoes an exothermic change of state from its second state to the desired final state. The product is normally removed from the vessel after the process is complete and the conversion may be effected while the liquid medium is in the reaction vessel or after it has been removed from the vessel. The first and final thermodynamic states may be identical but this is not essential provided that, in both states, th heat sink material is both particulate and substantially insoluble in the liquid medium.

It is essential that the heat sink material is particulate in its first state in order that it can undergo an endothermic change of state while remaining in the liquid medium. It is essential that the heat sink material is particulate in its final state in order that it does not dilute the product undesirably and can remain as a dispersion of solid particulate material in the final gel product.

The endothermic phase change is a change from one thermodynamic state to another and includes physical and chemical changes. For example the change may be a solid to liquid change, i.e. melting, or a solid to solid change, for example a change in the degree of hydration or some other chemical change between one solid state and another, or some other rearrangement of crystalline structure, or the phase change may be a combination of solid to solid and solid to liquid changes. When the second thermodynamic state includes a molten or other liquid phase, this phase preferably is substantially immiscible with the liquid medium.

The exothermic process is, in the invention, normally conducted on a volume of liquid medium such that substantial overheating would occur in the absence of the heat sink. For instance small volumes, such as relatively thin layers, of liquid medium may not overheat significantly in the absence of the heat sink because indirect cooling with air or other coolant may hold the temperature adequately. The process of the invention is generally conducted in such a manner, and in particular using an amount of heat sink material, that the maximum temperature of the liquid medium, even on a microscale, is at least 10° C., and preferably at least 20° C., below what it would be in the absence of the heat sink.

Generally the heat sink material undergoes an endothermic phase change at a temperature at which it is desired to hold the liquid medium and preferably the amount of heat sink material in the liquid medium is such that the medium is held at a substantially constant temperature for at least part of the duration of the process, this substantially constant temperature being the temperature of the endothermic change of state. This may be any temperature between the melting and boiling points of the liquid medium. Generally reactions take place at substantially atmospheric pressure, and so the transition temperature of the heat sink material is usually in the range of from 1° to 100° C., when the medium is aqueous, preferably in the range of from 10° to 100° C. and more preferably in the range of from 25° to 80° C. Of course, lower and higher temperatures than those quoted may be used for reactions which take place above or below atmospheric pressure. Suitably the specific latent heat of the heat sink material is at least 50 kJ.kg$^{-1}$, preferably at least 60 kJ.kg$^{-1}$ and is usually in the range of from 140 to 300 kJ.kg$^{-1}$.

The amount of heat sink material added to control the temperature of $T_2$ is insufficient to absorb the whole exotherm but is generally sufficient to absorb at least 50% of the exotherm and preferably at least 75% of the exotherm. When the temperature does rise, its rise may be uncontrolled or it may be controlled at a substantially constant temperature $T_3$, higher than the controlled low temperature, $T_2$. This can be achieved by conducting the exothermic process in the presence of a first particulate heat sink material that undergoes its endothermic change of state at $T_2$ and a second particulate heat sink material that undergoes its endothermic change of state at $T_3$, the amount of the first material being such that the medium is held at the substantially constant temperature $T_2$ for part of the proces and the amount of second material being such that the temperature of the medium then rises and is held at a substantially constant temperature $T_3$ for part of the process. Similarly, further incremental increases to still higher but constant temperatures can be achieved by including additional heat sink materials having different endothermic phase change temperatures. When more than one heat sink material is used, the total amount of heat sink material may be sufficient to absorb the entire exotherm but if desired the amount may be insufficient, in which event the temperature will rise, without control, after all the heat sink material has canged to a second thermodynamic state.

All of the heat sink material may be added to the liquid reaction mixture at the start of the reaction or some may be added after the reaction has started.

The amount of particulate heat sink material used in the invention will be selected having regard to the heat of the reaction, the heat transfer rate, the heat capacity of the heat sink and any diluent, and the degree of temperature control that is required. Often the amount of particulate material (i.e. the amount that is additional to any heat sink material that has dissolved into the polymerisable material) is at least 0.5 parts and normally 1 to 5 parts, preferably 1 to 2 parts, by weight per part by weight of reactants.

Any heat sink material that is dissolved in the liquid medium does not contribute to the temperature control and so the heat sink preferably has low or no solubility in the liquid medium. If the material does have any solubility in the liquid medium it must be present in an amount above saturation.

The use of materials that have an exothermic transition temperature from the second state to a final state at ambient, or preferably above ambient, permits the final state to be achieved by simple cooling, for instance indirect cooling by cooling water or exposure to the atmosphere. The endothermic change of state should therefore normally occur at a temperature above 20° C., and preferably above 25° or 30° C. Usually the exothermic change occurs at the same temperature.

Preferred heat sink materials for use in the invention are crystalline materials, generally inorganic crystalline materials. Preferred heat sink materials are ionic.

Preferred matierials are hydrates, especially hydrates of inorganic salts. Such materials generally undergo a change in the degree of hydration during the endothermic phase change and this change may also be accompanied by melting. If the degree of hydration of the heat sink material decreases above the transition temperature, the reaction medium is diluted slightly by the water molecules released by the material. The dilution is reversed when the material is returned to below the transition temperature. Typical materials are calcium chloride hexahydrate (optionally mixed with potassium chloride), sodium sulphate decahydrate, disodium hydrogen phosphate dodecahydrate or heptahydrate, calcium nitrate tetrahydrate, calcium chloride tetrahydrate, sodium thiosulphate pentahydrate, sodium acetate trihydrate, sodium aluminium sulphate dodecahydrate, barium hydroxide octahydrate, zinc nitrate hexahydrate, sodium carbonate decahydrate, lithium chloride trihydrate, strontium bromide hexahydrate, calcium bromide hexahydrate, ferric bromide hexahydrate and tetrasodium pyrophosphate decahydrate. Particularly preferred materials for use in aqueous reactions are hydrates of sodium sulphate, sodium acetate and tetrasodium pyrophosphate decahydrate as they are very effective heat sinks at preferred temperatures ranging between 25° and 80° C. and have relatively low solubility in the liquid medium. For instance, sodium sulphate decahydrate will generally be less than 5% soluble (so that a relatively low amount is wasted in solution) and tetrasodium pyrophosphate decahydrate is substantially insoluble in the reaction mixture.

The polymerisable material may be any polymerisable monomer or prepolymer or mixture thereof that is polymerisable by an exothermic reaction. Generally any prepolymer undergoes chain lengthening during polymerisation. Polymerisation that involves substantially only cross-linking, without significant chain lengthening (for instance as described in British Patent Specification 1,584,559 or U.S. Pat. No. 4,273,667) generally is not exothermic. The polymerisable material generally comprises polymerisable monomer and preferably comprises one or more mono-ethylenically unsaturated monomers, especially acrylic monomers, or prepolymers formed from them. The polymer may be anionic, cationic or nonionic. Suitable acrylic monomers include (meth)acrylic acid and its salts, (meth)acrylic esters and amides, diallyldialkyl ammonium chlorides, 2-acryl-amido 2-methyl propane sulphonic acid and its salts, N-vinyl, N-methyl acetamide and allyl sulphonic acid and its salts. Preferred monomers are acrylamide, sodium acrylate, dialkylaminoalkyl (meth)acrylates and dialkylaminoalkyl-(meth) acrylamides, including quaternised derivatives of the dialkylamino compounds, for instance quaternised dimethylaminoethyl acrylate. The monomer may be a Mannich base of acrylamide. Blends of two or more of the monomers are often preferred, so as to form copolymers. Other monomers that may be used include vinyl pyrrolidinone and vinyl sulphonic acid and the monomers necessary to form styrene maleic anhydride copolymers or dimethylamine-epichlorhydrin polymers.

A process of the invention is one in which a water soluble polymer is made by exothermic gel polymerisation of a bulk aqueous solution of polymerisable material and the heat sink material is included in the aqueous solution. Whereas gel polymerisation processes normally have to be conducted at a solids concentration of below 35% it is now possible to operate them satisfactorily at solids concentrations of 50 to 60% or even more and to obtain, at these high concentrations, polymers that are at least as satisfactory and are generally more satisfactory than the polymers obtained at lower concentrations. Thus it is possible to obtain polymers of increased molecular weight and reduced chain branching.

The heat sink material may remain in the product at the end of the reaction. For instance, a reaction in which the heat sink material undergoes a solid to liquid phase change may first be cooled to reverse the phase change and to return the heat sink material to a solid form. The product of the process is a polymeric gel in which particulate heat sink material is dispersed. The gel is removed from the reaction vessel and comminuted in one or more stages and dried. This drying may be before, during or after the comminution.

Conveniently the heat sink material is an inorganic hydrate which above the transition temperature undergoes a change to a state of lower hydration in which it is particulate. Comminution of the product gel is carried out while the heat sink material is in its state of lower hydration and the warm particles are then dehydrated, e.g. by warm air.

Comminution is, at least in the final stage, generally by grinding and the presence of particulate in the gel, greatly facilitates the grinding. The presence of the particulate heat sink material renders the gel more friable and more readily ground. Additionally, irrespective of the state of the heat sink material at the time of grinding, the gel will generally have a higher polymer content than polymer gels made by conventional methods and so there is less water to remove by drying and the product is less sticky and so is easier to grind.

The following are examples of the invention.

EXAMPLE 1

25 g methylchloride quaternised dimethylaminoethyl acrylate, 25 g crystalline acrylamide and 50 g water are mixed and cooled to 0° C. and then 82.4 g sodium sulphate decahydrate are added. The resultant slurry is transferred to a 200 g capacity Deware flask equipped with stirrer and nitrogen bubbler. The mix is blown with nitrogen for 10 minutes whilst being gently stirred, the nitrogen bubbler was then withdrawn from the liquid and 5 cm$^3$ 1% aqueous ammonium persulphate and 1 cm$^3$ 0.7% aqueous ferrous ammonium sulphate are added. Polymerisation commences immediately at 0° C. The stirrer is stopped when the temperature has risen to 20° C. The temperature continues to rise to about 32° C. at which it remains constant for at least most of the polymerisation.

The product is a friable gel which can be cut into 6 mm strips while still at 32° C., dried at 70° C. and ground to a fine powder. This product is designated below as Product A.

The process is repeated using 41.2 g of the sodium sulphate instead of 82.4 g. The powder is designated Product B.

The process is repeated again omitting sodium sulphate. The product is designated Product C.

The process is repeated using an extra 82.4 g water in place of the sodium sulphate. The product is designated Product D.

The intrinsic viscosity and flocculation activity of the products are determined. To determine flocculation activity, 10 cm$^3$ 0.1% active polymer solution is added to 100 cm$^3$ sewage sludge stirred at 1000 rpm. The flocculated sludge is stirred for a further 25 seconds and the degree of flocculation measured by capillary suction time measurements (CST). The sewage sludge is a digested primary/activated sludge ex Rotherham sewage works. The results are shown in the following table.

| Product | Intrinsic Viscosity* (dlg$^{-1}$) | Average CST (secs) |
|---|---|---|
| A | 6.18 | 27.4 |
| B | 5.99 | 36.0 |
| C | 2.83 | 272.1 |
| D | 4.14 | 80.6 |
| Water | — | 2140 |

*Intrinsic viscosity is measured in 3M NaCl at 25° C.

The increase in intrinsic viscosity in Products A and B compared to D and, especially, C indicates the increased molecular weight obtainable by the inclusion of sodium sulphate. The lower CST values for products A and B compared to Products D, and especially C, indicate the greatly increased effectiveness of the polymers made using sodium sulphate decahydrate and water. Product A in particular is contaminated with traces of acrylamide and this causes toxicity problems.

EXAMPLE 2

The process of Example 1A can be repeated using a mixture of sodium sulphate decahydrate with sodium acetate trihydrate. The polymerisation will then proceed at about 32° C. for most of its time but can then be allowed to go to a temperature of about 50 to 60° C. (at which it will be held by the sodium acetate trihydrate). This reduces free monomer in the gel.

EXAMPLE 3

88 g of 100% acrylamide, 212.5 g of a 70% solution of methyl chloride quaternised dimethylaminoethyl acrylate, 0.1 g of 40% tetra sodium ethylenediaminetetraacetate and 15 g of adipic acid were admixed to give a homogeneous solution and then adjusted to pH 3.5.

100 g aliquots were taken and varying quantities of sodium sulphate decahydrate added. The resultant slurries were cooled to 0° C. and transferred to pre-cooled vacuum flasks. After thoroughly deoxygenating with nitrogen gas, the monomer mixes were initiated with 0.3 ml 0.5% aqueous solution of KBrO$_3$, and 0.26 ml 1% aqueous solution of Na$_2$SO$_3$. Polymerisation started at 0° C., the temperature rose to about 32° C. and was held at that and, depending on the amount of sodium sulphate decahydrate, terminated either at that temperature or a higher temperature.

The following results were obtained.

| PRODUCT | E | F | G | H |
|---|---|---|---|---|
| g Na$_2$SO$_4$.10H$_2$O/ 100 g monomer | 20 | 40 | 60 | 0 |
| Max. temperature °C. | 100 | 82 | 66 | >110° C. |
| Time for complete polymerisation | 20 min | 5½ hr | 4 hr. | <2 mins |

Polymerisation E is in accordance with the invention. It showed no apparent thermal plateau at low temperature but the time for complete polymerisation was increased and the full potential exotherm was not observed. Preferably however the temperature is held at a plateau temperature of about 30° C. and in polymerisations F and G the temperature remained at about 30° C. for 90 and 130 mins. before continuing to the higher temperature.

Polymerisation H rapidly reached a temperature of greater than 100° C. and the resultant gel was forceably ejected from the flask by the steam generated. The resultant gel was difficult to handle due to the large number of bubbles entrained in the product.

Polymers E-G were friable gels which readily ground and dried to give fine products in which the sodium sulphate remains, at ambient temperatures, in its lower state of hydration, e.g. as anhydrous sodium sulphate. They were substantially free of acrylamide or other monomer and were wholly water soluble. Polymer M included cross linked polymer of reduced solubility.

EXAMPLE 4

Processes similar to Examples 3E, F and G can be successfully conducted using, as monomer, acrylamide alone, acrylic acid (as sodium salt) alone, or blends thereof in the presence of approximately an equal weight of water and sufficient sodium sulphate decahydrate to hold the temperature at about 30° C. for most of the reaction, with the final temperature being about 80° to 90° C. The products have very high molecular weight, are wholly water soluble and are free of residual monomer.

We claim:

1. A bulk gel polymerization process for producing a water soluble polymer by exothermic bulk gel polymerisation of a reaction mixture that comprises 100 parts polymerisable monoethylenically unsaturated monomers dissolved in 33 to 250 parts added free water and that contains a heat sink material that is in a first thermodynamic state, is particulate and is substantially insoluble in the reaction mixture, in which the polymerisation reaction is initiated at a temperature $T_1$ at which the heat sink material remains in its first thermodynamic state, the temperature of the reaction mixture rises exothermically to $T_2$ at which the heat sink material undergoes an endothermic change of state to a second thermodynamic state by absorbing the exothermic heat of polymerisation and the amount of heat sink material is such that when the all the heat sink material is in the second thermodynamic state, the temperature rises exothermically to $T_3$, and in which the process includes the step of converting the heat sink material from the first thermodynamic state to a final thermodynamic state in which it is particulate and substantially insoluble in liquid medium.

2. A bulk gel polymerization process according to claim 1 in which the temperature of the reaction medium is held at a substantially constant temperature $T_2$ during the process.

3. A bulk gel polymerization process according to claim 1 in which the temperature of the reaction mixture is held at a substantially constant temperature $T_2$ for at least 50% of the polymerisation.

4. A bulk gel polymerization process according to claim 1 in which 5 to 50% of the polymerisation occurs during the temperature rise between $T_1$ and $T_2$ and 5 to 25% of the polymerisation occurs during the temperature rise to $T_3$.

5. A bulk gel polymerization process according to claim 1 in which $T_1$ is in the range 0° to 20° C., $T_2$ is in the range 25° to 60° C. and $T_3$ is in the range 60° to 100° C.

6. A bulk gel polymerization process according to claim 1 in which the polymerisation reaction is initiated by a Redox initiator.

7. A bulk gel polymerization process according to claim 1 in which the monomers comprise monomers selected from acrylamide and acrylic acid and the amount of water is from 75 to 250 parts per 100 parts of monomers selected from acrylamide and acrylic acid.

8. A bulk gel polymerization process according to claim 1 in which a further heat sink material in a first thermodynamic state in which it is particulate and insoluble in the reaction mixture is included in the reaction mixture, and this material can undergo an endothermic change of state at a temperature $T_4$ higher than $T_2$ and in which process, when all the first heat sink material is in its second thermodynamic state, the temperature of the reaction mixture rises from $T_2$ to $T_4$ at which the further heat sink material undergoes an endothermic change of state to its second thermodynamic state.

9. A bulk gel polymerization process according to claim 8 in which, when all the further heat sink material is in its second thermodynamic state, the temperature of the reaction mixture rises from $T_4$ to a higher temperature.

10. A bulk gel polymerization process according to claim 1 in which the heat sink material is an ionic crystalline material.

11. A bulk gel polymerization process according to claim 1 in which the heat sink material is the hydrate of an inorganic salt, and the phase change is a change in the degree of hydration.

12. A bulk gel polymerization process according to claim 1 in which the heat sink material is selected from sodium sulphate decahydrate and sodium acetate trihydrate.

13. A bulk gel polymerization process according to claim 8 in which the heat sink material consists of sodium sulphate decahydrate and further heat sink material is sodium acetate trihydrate.

14. A bulk gel polymerization process according to claim 3 in which the polymerization reaction is initiated by a redox initiator, $T_1$ is in the range of 0 to 20 degrees C, $T_2$ is in the range of 25 to 60 degrees C and $T_3$ is in the range of 60 to 100 degrees C.

15. A bulk gel polymerization process according to claim 14 in which the monomers comprise monomers selected from acrylamide and acrylic acid and the amount of water is from 75 to 250 parts per 100 parts monomers.

* * * * *